Patented May 15, 1923.

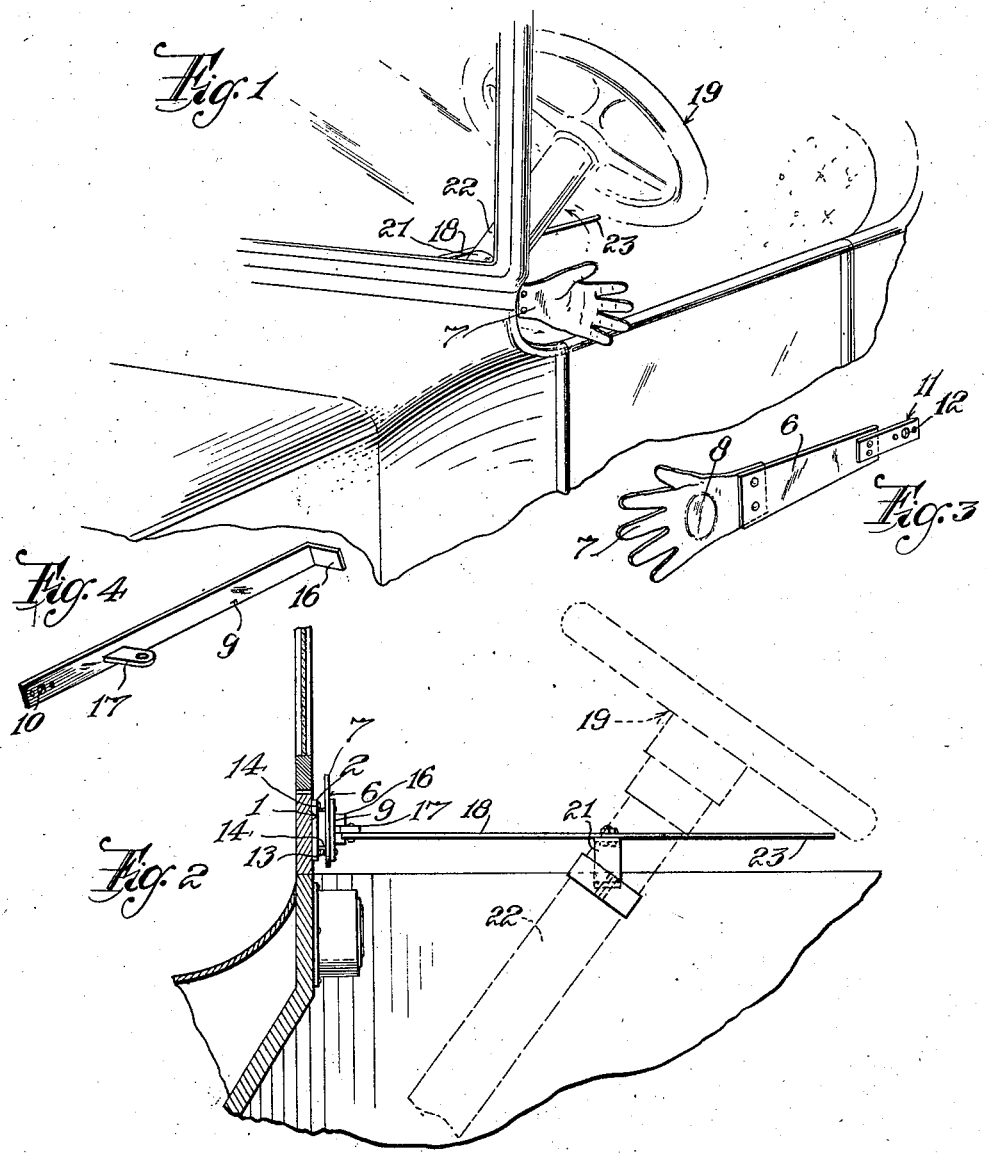

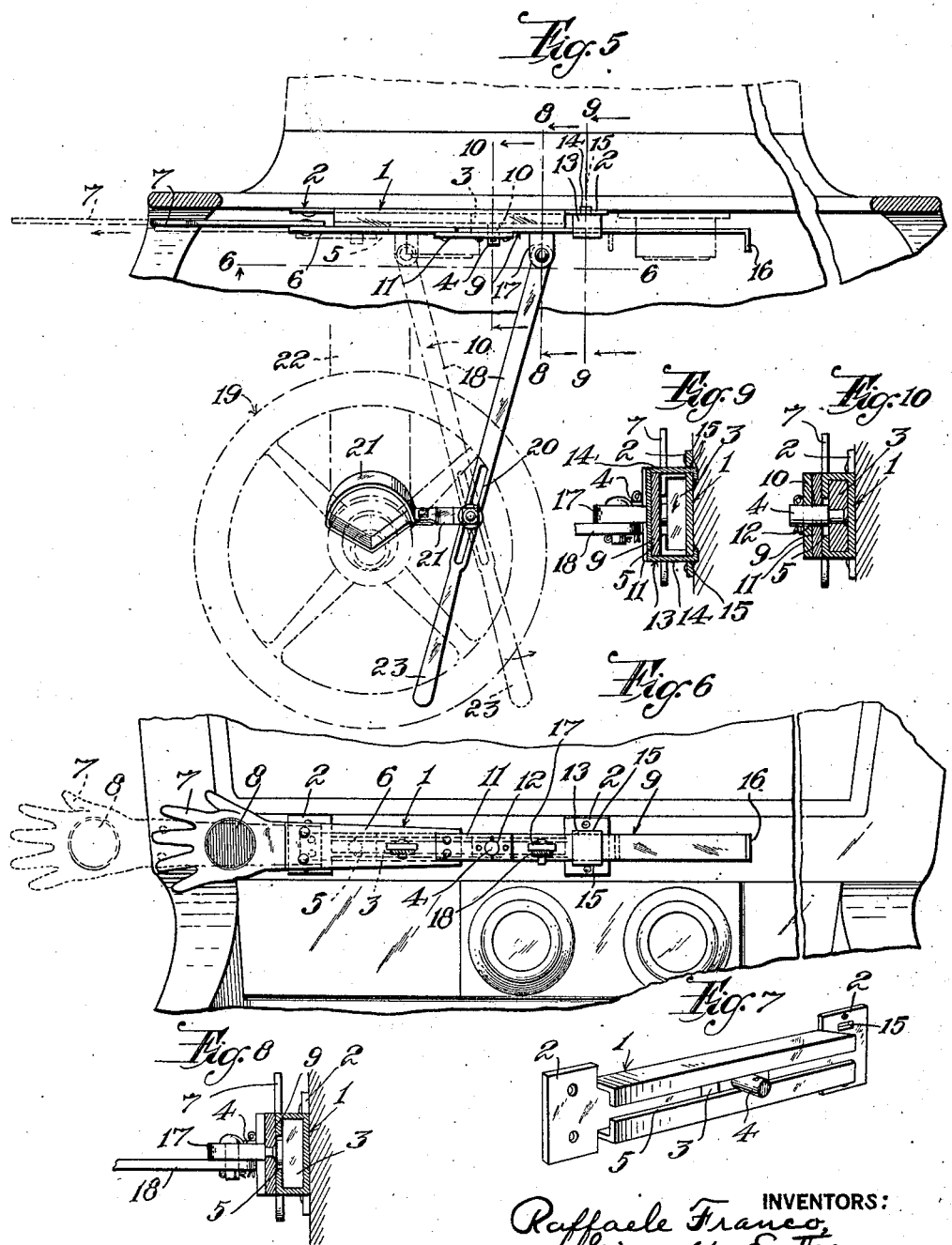

1,455,331

UNITED STATES PATENT OFFICE.

RAFFAELE FRANCO AND GIUSEPPE ESTER, OF NEWARK, NEW JERSEY.

DIRECTION INDICATOR FOR VEHICLES.

Application filed July 21, 1922. Serial No. 576,426.

*To all whom it may concern:*

Be it known that we, RAFFAELE FRANCO and GIUSEPPE ESTER, both citizens of the United States, and residents of Newark, in the county of Essex and State of New Jersey, have invented new and useful Improvements in Direction Indicators for Vehicles, of which the following is a specification.

This invention relates to a signal for vehicles specifically designed to be applied to an automobile and actuated by the driver to warn the drivers of vehicles in the rear of an intended change in direction of movement and thus avoid collisions.

The objects of the invention are to provide a device of this character embodying novel features of construction and adapted to be easily and quickly operated by the driver of the automobile with one hand without distracting his attention from or interfering with the control of the automobile; to thus provide a signal including an extensible member adapted to be mounted on the dashboard or wind-shield of an automobile and carrying an indicator normally arranged within the automobile, and an operating lever adapted to be mounted on the steering post adjacent the steering wheel for extending said member to project said indicator outwardly at the side of the automobile so as to be visible from the front and rear, and to obtain other results and advantages as may be brought out by the following description.

Referring to the accompanying drawings, in which like numerals of reference indicate the same parts throughout the several views, Figure 1 is a perspective view illustrating our invention applied to an automobile and the indicator projected therefrom;

Figure 2 is a vertical longitudinal sectional view showing the position of the device upon the vehicle;

Figure 3 is a detail perspective view of the indicator;

Figure 4 is a detail perspective view of a stop extension for said indicator;

Figure 5 is a plan view of the device upon a car showing in full lines the retracted positions of the parts and in dotted lines their extended positions;

Figure 6 is a view with the operating lever in section as on line 6—6, Fig. 5;

Figure 7 is a perspective view of a certain slideway;

Figure 8 is a section on line 8—8, Fig. 5;

Figure 9 is a section on line 9—9, Fig. 5, and

Figure 10 is a section on line 10—10, Fig. 5.

In the specific embodiment of the invention shown in said drawings, 1 indicates a slideway adapted to be secured to the dash or instrument board of a car by its ends 2, 2 and receiving intermediate said ends a slide 3 having a post 4 projecting through a longitudinal slot 5 in the front of the slideway. This post 4 receives an indicator 6 lying longitudinally and slidably against the front of the slideway and having at one end an appropriate signal such as the hand 7 with a red disk 8 on the rear side of the same, while its other end is connected to a stop extension 9. We have shown this stop extension as also apertured at 10 to receive the post 4 and underlie a cleat 11 which also overlies the body portion of the indicator 6 and is riveted to both said body and extension, being perforated as at 12 to receive the post 4. Any other equivalent construction might be employed, however.

The stop extension 9 projects through a guide or loop 13 secured to the end 2 of the slideway 1 by lugs 14 extending through slots 15 in said end and clinched at the back thereof. This guide 13 holds the stop extension 9 against edgewise movement up and down, so as to compel the indicator 6 to move in a straight line, and also is engaged by the stop 16 on the end of the stop 9 to limit projection of the indicator from the side of a vehicle.

Upon said extension 9 at the opposite side of the guide 13 from the stop 16 is secured a projection 17, preferably disposed in a plane perpendicular to the indicator and longitudinally thereof, and to said projection 17 is pivoted an operating lever 18 which is adapted to extend horizontally toward the driver's seat and terminate beneath the steering wheel 19 adjacent to the periphery thereof next the driver, as clearly shown in Figures 1 and 2. This operating lever 18 is fulcrumed by means of a slot 20 upon a bracket 21 clamped around the steering post 22 and suitably projecting therefrom at one side.

In operation, the driver projects the indicator, as shown in Figure 1 and in dotted lines in Figures 5 and 6, by pressing against the handle 23 of the lever 18, which handle is contiguous to the portion of the steering wheel grasped by the driver's hands and therefore very conveniently reached. A slight touch is sufficient to project the indicator, and it then remains projected until pressure in the opposite direction retracts it to the position shown in Figures 5 and 6, in full lines. In projecting the indicator the stop 16 limits movement of the lever handle 23, and in retracting it the projection 17 limits movement, if necessary, by engaging the guide or loop 13, the slot 22 affording a ready and easy movement of the parts. The signal is thus very conveniently and easily operated, with very little effort on the part of the driver.

While we have shown and described one embodiment of our invention, it will be understood that this is only for the purpose of illustrating the principles thereof, and that many modifications and changes can be made in the detail construction of the signal without departing from the spirit or scope of the invention. Therefore, we do not wish to be understood as restricting ourselves except as required by the following claims when construed in the light of the prior art.

Having thus described the invention, what we claim is:

1. In a vehicle signal, the combination of an indicator adapted to be projected laterally from a vehicle, an operating lever, means for fulcruming said lever upon the inclined steering post of a vehicle so as to swing in a horizontal plane with one end of itself adjacent the lower part of the rim of the steering wheel, and means connecting the other end of the lever to said indicator to project and retract the same as the lever is swung.

2. In a vehicle signal, the combination of an indicator adapted to be projected laterally from a vehicle, an operating lever having a longitudinal slot intermediate its ends, means for attachment to the steering post of a vehicle having a fulcrum slidable in said slot and adapted to position the operating lever in a horizontal plane with one end of it adjacent the lower part of the rim of the steering wheel and means pivoting said lever to said indicator to project and retract the same as the lever is swung.

3. In a vehicle signal, the combination of an indicator adapted to be projected from a vehicle, an operating lever, means for fulcruming said lever upon the steering post of a vehicle in a plane oblique thereto and adapted to cause one end of said lever to swing in a path in close proximity to the rim of the steering wheel, and means for connecting the other end of the lever to said indicator to project and retract the same as the lever is swung.

RAFFAELE FRANCO.
GIUSEPPE ESTER.